Patented Feb. 20, 1923.

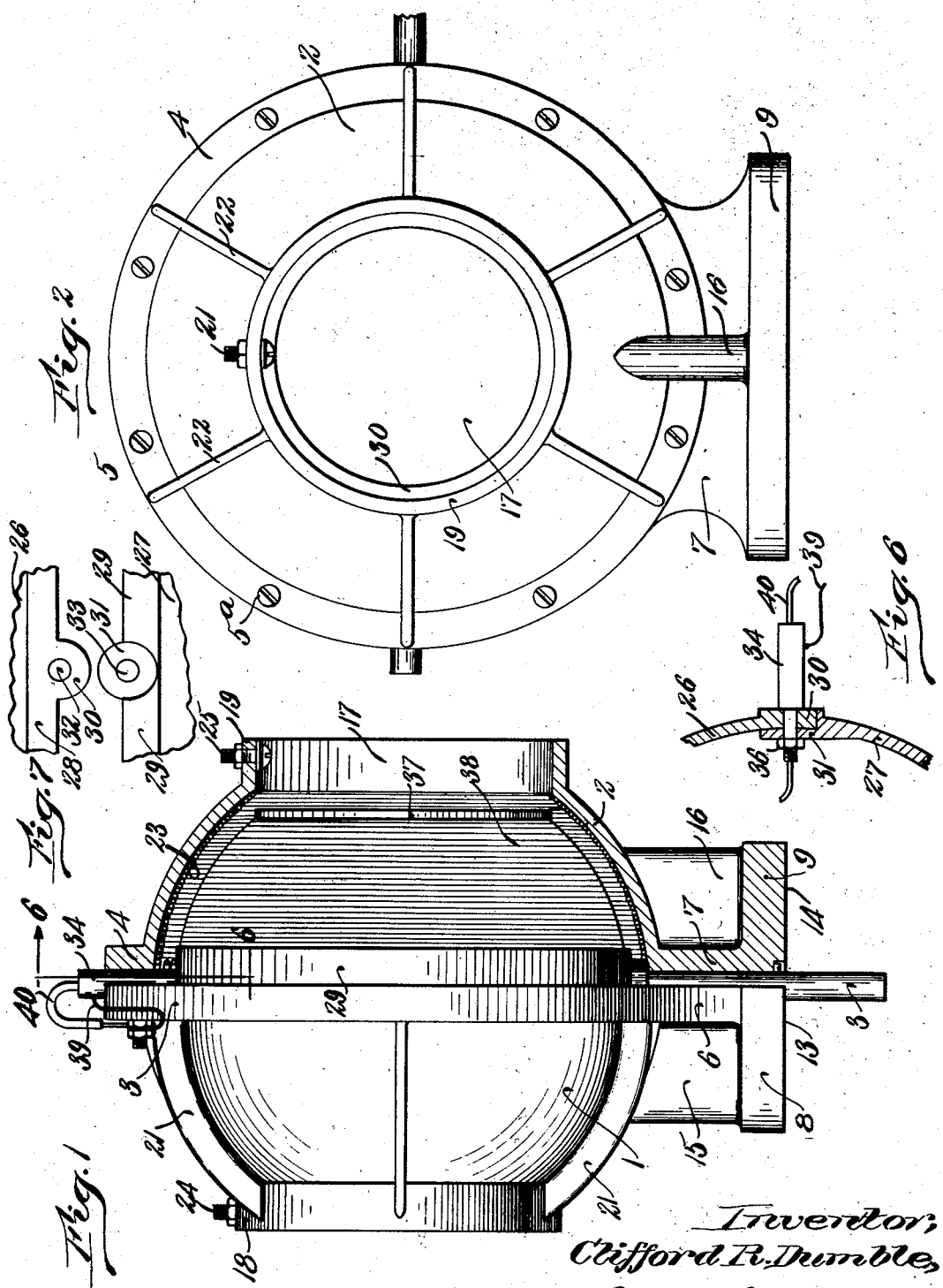
Feb. 20, 1923.
C. R. DUMBLE.
VARIOMETER.
FILED JULY 24, 1922.
1,446,166.
2 SHEETS—SHEET 1.
Inventor;
Clifford R. Dumble,
by Roberts, Roberts & Cushman
attys.

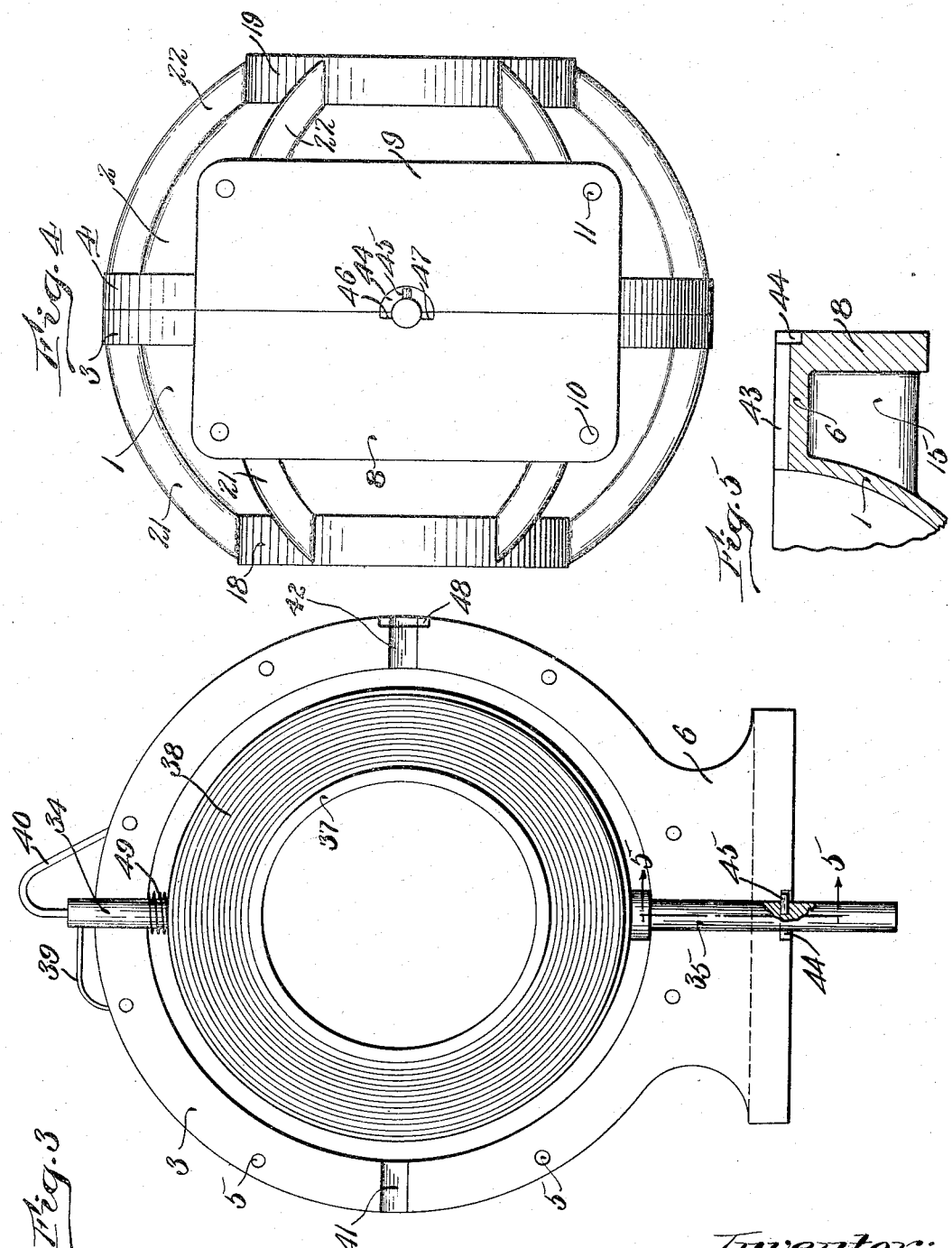

1,446,166

UNITED STATES PATENT OFFICE.

CLIFFORD R. DUMBLE, OF ARLINGTON, MASSACHUSETTS, ASSIGNOR OF ONE-HALF TO WILLIAM G. MITCHELL, OF MALDEN, MASSACHUSETTS.

VARIOMETER.

Application filed July 24, 1922. Serial No. 576,966.

*To all whom it may concern:*

Be it known that I, CLIFFORD R. DUMBLE, a citizen of the United States of America, and resident of Arlington, in the county of Middlesex and State of Massachusetts, have invented new and useful Improvements in Variometers, of which the following is a specification.

This invention concerns radio apparatus and relates more particularly to variometers of the spherical type.

Principal objects of the present invention are to provide a variometer of the above type which may be mounted either upon a horizontal baseboard or vertical panel as desired without necessitating a change in the position of the rotor shaft; to provide means for limiting the angular extent of movement of the rotor to an amount sufficient to provide a maximum variation in inductance; to provide simple means for retaining the rotor in any desired position of adjustment; to provide protecting means for the windings of the stator; and to provide casings or frames for both stator and rotor of simple and durable design and such as may be manufactured with a minimum expenditure of time and labor.

Briefly stated the invention consists in forming the rotor casing or frame from a pair of like hemispherical shells having their edges secured together, thereby forming a hollow spherical casing upon the exterior surface of which the rotor windings are mounted, and similarly forming the stator casing or frame as a hollow sphere having the stator windings secured to its inner concave surface. As each half of each casing is like its complemental half, it is possible to mold all of the parts by the use of but two different molds and the shape of the shells is such as to permit of their being molded in molds of simple form, thus greatly facilitating the operation and decreasing the cost thereof. The meeting edges of the hemispherical shells forming the stator frame are provided at 90° intervals with radial grooves of semi-circular cross-section, the grooves of each shell being complemental to those of the other and in the complete structure constituting bearing openings for the rotor shaft. The stator frame is thus provided with two sets of bearings for the rotor shaft, arranged at right angles to each other, permitting the stator frame to be rotated in the plane of the meeting edges of the shells of which it is formed, so as to bring either set of bearing openings into engagement with the rotor shaft. Usually the rotor shaft extends horizontally through the vertical panel of the apparatus and is provided with a handle at the front side of the panel, and with the arrangement above described, the rotor shaft may occupy this position whether the stator frame be secured to the panel or base of the apparatus. Each half of the stator frame is provided with a base flange or foot whereby the frame may be secured either to the baseboard or panel of the radio apparatus. Preferably the stator frame is of relatively thin material forming an imperforate covering or protection for the stator windings which are secured directly against its inner surface by means of a suitable cement, and the frame is strengthened by means of ribs and flanges outstanding from its outer surface. To retain the rotor in adjusted position, a frictional device is employed, preferably consisting of a compression spring encircling the rotor shaft and bearing at opposite ends against the stator and rotor frames, respectively. For limiting rotation of the rotor, the shaft is provided with a pin moving in a substantially semi-circular groove in the stator frame, such groove being concentric with the shaft bearing and terminating in abrupt shoulders constituting abutments with which the pin may contact.

In the accompanying drawings a preferred embodiment of the invention is illustrated by way of example and in such drawings.

Figure 1 is a side elevation, partly in vertical cross section showing the device of the present invention, the rotor shaft being vertical.

Figure 2 is an end elevation of the same device, but showing the rotor shaft as arranged horizontally.

Figure 3 is an end elevation showing the rotor shaft as arranged vertically, one half of the casing or frame for the stator being removed to show the interior construction.

Figure 4 is a bottom plan view of the complete device.

Figure 5 is a fragmentary, vertical cross section on the line 5—5 Figure 3, the rotor shaft being removed.

Figure 6 is a fragmentary vertical cross section on the line 6—6 of Figure 1.

Figure 7 is a fragmentary, disassembled view illustrating the mode of connecting the parts of the rotor frame.

Referring now to the drawings for a more detailed description of the device, the variometer is shown as comprising a stator frame or casing formed of two complemental and substantially like parts. Each of such parts consists of a substantially hemispherical shell, formed preferably by a molding operation from some phenol-condensation product, such, for example, as bakelite. These hemispherical shells are indicated generally at 1, 2, respectively, such shells having outstanding radial flanges 3, 4 respectively at their edges, such flanges together constituting what may be termed an equitorial rib extending circumferentially about the frame or casing. These flanges are provided with openings such as 5 for the reception of bolts or screws, 5ª, by means of which the shells are suitably secured together. The flanges, 3, 4, are widened at one portion of their peripheries, as indicated at 6, 7, respectively, thus forming outstanding ears to which base flange members 8, 9, respectively are secured. These base flange members provide aligned support engaging surfaces 13, 14 which lie in a plane substantially perpendicular to the plane defined by the meeting faces of the flanges 3, 4. The flange members 8, 9 are provided with openings 10, 11 respectively, for the reception of bolts or other attaching means whereby the variometer may be mounted upon a suitable support. From the central portion of such base flanges 8, 9 respectively, strengthening ribs or flanges 15, 16 extend to the outer surfaces of the shells 1, 2 respectively, such strengthening flanges being integrally united with the shells and with the ears 6, 7.

Each of the shells is provided with a polar opening such as 17, the plane of which is substantially parallel to the plane of the meeting edges of the flanges 3, 4, these openings being defined by annular flanges 18, 19 respectively, outstanding from the outer surfaces of the respective shell members. Each of the shells is provided with a series of ribs 21, 22 respectively outstanding radially from its outer surface, such ribs lying in meridian planes and extending from the flange 3 to the flange 18, and from the flange 4 to the flange 19, such ribs serving greatly to strengthen the shells which may thus be made of relatively thin material. These ribs are preferably of tapering cross section to facilitate the drawing of the completed shell from the mold.

The inner surface of each hemispherical shell member is substantially smooth and of spherical curvature, and against such surface of each shell is secured a winding 23, of insulated wire which may be secured directly to the shell by means of any suitable cement. The windings 23 of the two shell members are connected in series at their adjacent ends while the other terminals of such windings are secured to binding posts 24, 25 respectively.

Within the stator casing thus provided, a rotor casing or frame is arranged. This rotor casing or frame is also preferably formed of two substantially like and complemental hemispherical shells 26, 27 together constituting a substantially spherical hollow support for the windings of the rotor. These parts, 26, 27, are provided respectively with flange members 28, 29 (Fig. 7) at their meeting edges together constituting an equitorial rib surrounding the rotor casing. At diametrically opposite points in such flange members, ears such as 30, 31 project therefrom, one ear of each flange being at a somewhat greater radial distance from the center of the shell than the other so that when assembled one ear of each flange may overlap the corresponding ear of the other (see Fig. 6). These ears are provided with openings such as 32, 33 through which pass stub shafts 34, 35. These shafts, when the parts are assembled, are aligned with one another and define the axis about which the rotor turns. Preferably, these shafts are screw threaded at their inner ends for the reception of nuts 36 by means of which they are secured in place, at the same time holding the members 26, 27 of the rotor frame in operative engagement. Each of the rotor shell members 26, 27 is provided with an opening, the plane of which is substantially parallel to that of the meeting edges of the flanges 28, 29, such openings being defined by outstanding flanges such as 37.

A rotor winding is secured to the outer surface of each of the members 26, 27, respectively, extending between the central flanges 28, 29 and the respective flanges 37, these windings being secured by cement. The windings of the two halves of the rotor shell are arranged in series, adjacent ends thereof being connected while the other terminal of one such winding is grounded on one of the shafts, as for example, shaft 34. This shaft is preferably hollow and the terminal 40 of the other winding passes out through the opening in such shaft. A suitable lead wire 39 may be secured to the shaft 34 outside its bearing in the stator frame.

The stator frame is preferably provided with two pairs of aligned journal openings, one pair of such openings being shown at 41, 42 respectively, Figure 3, while in such figure the shafts 34, 35 occupy the other pair of aligned openings, one of the latter openings being shown at 43 in Fig. 5. These openings are preferably formed by providing grooves of semicircular cross section in the meeting flanges 3, 4 of the stator frame, four such grooves being provided for each frame, spaced 90° apart from each other. When the flanges 34 are secured together, these semicircular grooves form journal openings of proper form for the reception of the rotor shaft elements.

Associated with the journal opening 43 of one pair is a recess 44 of a diameter somewhat greater than that of the journal opening and concentric therewith, such recess being of substantially semicircular extent and serving for the reception of a pin 45 projecting from one of the shaft members as, for example, the shaft 35. This pin moves freely in the recess 44 but is limited in its movement by engagement alternatively with the shoulders 46, 47 which terminate such recess. A similar recess cooperating with the journal openings 42 is shown at 48.

A coiled compression spring 49 surrounds the shaft 34, one end of such spring bearing against the inner surface of the stator frame or casing while the other end of such spring engages the outer surface of the rotor frame. This spring is normally compressed and thus serves as a friction brake to oppose turning of the rotor frame.

The variometer thus constructed is of extremely simple form. The stator frame and the rotor frame each consists merely of two like parts suitably secured together so that it is only necessary for the manufacturer to provide two molds for use in making up a variometer of this type, one of such molds serving for forming the halves of the stator frame while the other is employed in making the halves of the rotor frame. The form of the parts, furthermore, is such as to permit the employment of molds of very simple character so that the cost of construction of the frame members is reduced to a minimum. Moreover, the design is such as to secure a maximum of strength with a minimum quantity of material, while at the same time providing a continuous supporting shell for the stator windings which serves to protect the latter from accidental injury.

By the provision of two pairs of journal openings in the stator frame, it is possible, while maintaining the rotor shaft in a given position, to rotate the stator frame through an angle of 90°, thus permitting such stator frame to be mounted upon either a horizontal or vertical support as may be desired while the shaft may extend in a horizontal direction in either case. The provision of the pin 45 with the recess 44 serves to limit turning of the rotor substantially to 180° of angular movement, thus providing for maximum variation in the inductance but at the same time avoiding any possibility of continuous turning of the rotor in the same direction such as might interfere with the proper connection of the lead wires thereto.

The spring 49 which constitutes a friction brake contributes to the proper maintenance of the rotor in adjusted position, such spring tending to retain the parts in any position of adjustment but without necessitating the manipulation of latches or other holding devices and without interfering with any desired and intentioned adjustment of the rotor.

While a specific arrangement has herein been described, it is to be understood that various changes and rearrangements of parts as well as modifications of the shape thereof may well be made without departing from the spirit of the invention.

What I claim and desire to secure by Letters Patent of the United States is:

1. A variometer having a stator frame comprising a pair of like, hemispherical shells, each shell having an equatorial flange, an ear extending outwardly from the edge of each flange, a base member projecting from each ear, and means for securing said flanges together with the base members lying in the same plane.

2. A variometer having a stator frame comprising a hemispherical shell having a radial, equatorial flange and a polar opening, a flange surrounding the latter opening, and a plurality of ribs outstanding from the outer surface of said shell and terminating in the respective flanges.

3. A variometer having a stator frame comprising a hemispherical shell of relatively thin material having a radial equatorial flange and a polar opening, a flange surrounding said opening, and a plurality of spaced ribs, defining meridian planes, connecting said flanges and projecting from the outer face of the shell.

4. A variometer having a stator frame comprising a hemispherical shell of relatively thin material, and a plurality of spaced ribs projecting integrally from the outer surface of said shell and defining meridian planes.

5. A variometer having a stator frame comprising a hemispherical shell of relatively thin material, and a plurality of ribs, tapering outwardly in cross section, projecting from the outer surface of the shell and serving to strengthen the same.

6. A variometer comprising a hemispherical shell having a radially projecting ear lying in its equatorial plane, and a base flange projecting from said ear and having a support engaging surface substantially perpendicular to the plane of the ear.

7. A variometer comprising a hemispherical shell having a radial equatorial flange, said flange being widened at one portion to form an ear, a base flange integrally united with said ear and having a support engaging surface perpendicular to the plane of the ear, and a brace member integrally uniting said base flange with the outer peripheral surface of the shell.

8. A variometer comprising a hemispherical shell having an ear outstanding therefrom substantially in the plane of its equatorial edge, a base flange united with said ear and having a support engaging surface, and a brace member extending from the base flange to the outer peripheral surface of the shell.

9. A variometer comprising a pair of complemental hollow shells arranged with their cavities opposed to each other, an ear projecting from each of said shells, a flange carried by each ear, said flanges having support engaging surfaces lying substantially in the same plane, and brace members uniting the ears with their respective flanges.

10. A variometer comprising a spherical stator frame, and means for supporting said frame, said frame having radial journal openings disposed in an equatorial plane and arranged at an angle to one another.

11. A variometer comprising a spherical stator frame, and a rotor having oppositely extending shaft elements, said frame having a pair of aligned journal openings for the respective shaft elements, and a second pair of aligned journal openings disposed at an angle to said first pair.

12. A variometer comprising a hollow spherical stator frame having a base member, a spherical rotor frame arranged within the stator frame, said rotor frame having a shaft, and bearings in the stator frame arranged at right angles to each other and alternatively engageable with the rotor shaft whereby to permit the base member of the stator frame to be secured to a horizontal or vertical supporting surface as desired without varying the position of the rotor shaft.

13. A variometer comprising a stator frame having a base member provided with a support engaging surface, a rotor having oppositely extending shaft elements, said stator frame having a pair of aligned journal openings for the respective shaft elements, the axes of said openings lying in a plane perpendicular to that of said support engaging surface, and a second pair of aligned journaled openings having their axes disposed at right angles to the axes of said first openings.

14. A variometer comprising a stator frame, and a base therefor provided with a support engaging surface, said frame having a pair of aligned journal openings whose axes lie in plane perpendicular to said supporting surface, and a second pair of aligned journal openings disposed at right angles to the openings of said first pair and in the plane thereof, the axes of the journal openings of one pair being perpendicular to said supporting surface.

15. A variometer comprising a hollow spherical stator frame having a base member provided with a support engaging surface, a rotor within said frame having oppositely extending shaft elements, aligned diametrally opposed radial journal openings in said stator frame, said openings being disposed in a plane perpendicular to said support engaging surface, and having their axes perpendicular to said surface, and a second pair of diametrally opposed journal openings in said frame lying in the same plane as the first openings but with their axes parallel to said surface.

Signed by me at Boston, Massachusetts, this 12th day of July, 1922.

CLIFFORD R. DUMBLE.